US008108856B2

(12) United States Patent
Sahita et al.

(10) Patent No.: US 8,108,856 B2
(45) Date of Patent: Jan. 31, 2012

(54) METHOD AND APPARATUS FOR ADAPTIVE INTEGRITY MEASUREMENT OF COMPUTER SOFTWARE

(75) Inventors: Ravi Sahita, Beaverton, OR (US); Uday Savagaonkar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1305 days.

(21) Appl. No.: 11/694,478

(22) Filed: Mar. 30, 2007

(65) Prior Publication Data

US 2008/0244572 A1 Oct. 2, 2008

(51) Int. Cl.
G06F 9/455 (2006.01)
G06F 7/04 (2006.01)

(52) U.S. Cl. ................................. 718/1; 726/2
(58) Field of Classification Search ........... 718/1; 726/2
See application file for complete search history.

(56) References Cited

U.S. PATENT DOCUMENTS

| 5,983,350 | A | 11/1999 | Minear et al. |
| 6,631,417 | B1 | 10/2003 | Balabine |
| 6,725,371 | B1 | 4/2004 | Verhoorn, III et al. |
| 6,732,220 | B2 | 5/2004 | Babaian et al. |
| 7,111,146 | B1 | 9/2006 | Anvin |
| 7,370,233 | B1 | 5/2008 | Sobel et al. |
| 2002/0046305 | A1* | 4/2002 | Babaian et al. ............... 710/5 |
| 2002/0082824 | A1 | 6/2002 | Neiger et al. |
| 2003/0065676 | A1 | 4/2003 | Gbadegesin et al. |
| 2005/0132122 | A1 | 6/2005 | Rozas |
| 2005/0220143 | A1 | 10/2005 | DelRegno et al. |
| 2005/0235123 | A1 | 10/2005 | Zimmer et al. |
| 2006/0004944 | A1 | 1/2006 | Vij et al. |
| 2006/0225073 | A1* | 10/2006 | Akagawa et al. ............... 718/1 |
| 2007/0006175 | A1 | 1/2007 | Durham et al. |
| 2007/0043896 | A1 | 2/2007 | Daruwala et al. |
| 2008/0244573 | A1 | 10/2008 | Sahita et al. |
| 2008/0244725 | A1 | 10/2008 | Dewan et al. |
| 2008/0244758 | A1 | 10/2008 | Sahita et al. |
| 2009/0089860 | A1 | 4/2009 | Forrester et al. |

OTHER PUBLICATIONS

Dewan, P., et al., "Method and Apparatus for Managing Packet Buffers", U.S. Appl. No. 11/695,016, filed Mar. 31, 2007, 17 pgs.
Grevstad, E., "CPU-Based Security: The NX Bit", [online]. © 2004 Jupitermedia Corporation [retrieved on Jul. 10, 2004]. Retrieved from the Internet: (2004), 3 pgs.
Sahita, R., et al., "Method and Apparatus for Managing Page Tables From a Non-Privileged Software Domain", U.S. Appl. No. 11/695,021, filed Mar. 31, 2007, 18 pgs.
Sahita, R., et al., "Systems and Methods for Secure Association of Hardware Devices", U.S. Appl. No. 11/694,548, filed Mar. 30, 2007, 17 pgs.
Uhlig, R., et al., "Intel Virtualization Technology", *IEEE Computer Society*, 38(1), (2005),48-56.
"U.S. Appl. No. 11/694,548 Final Office Action mailed Oct. 29, 2010", 17 Pgs.

(Continued)

*Primary Examiner* — Meng An
*Assistant Examiner* — Blake Kumabe
(74) *Attorney, Agent, or Firm* — Schwegman, Lundberg & Woessner, P.A.

(57) ABSTRACT

Systems and methods are described herein that discuss how a computing platform executing a virtualized environment, in one example, can be integrity verified adaptively and on demand. This may occur at initial runtime, as well as during continued operations, and allows the platform user to install software from various vendors without sacrificing the integrity measurement and therefore the trustworthiness of the platform.

11 Claims, 3 Drawing Sheets

OTHER PUBLICATIONS

"U.S. Appl. No. 11/694,548, Non-Final Office Action mailed Apr. 29, 2010", 14 pgs.

"U.S. Appl. No. 11/694,548, Response filed Aug. 30, 2010 to Non Final Office Action mailed Apr. 29, 2010", 14 pgs.

"U.S. Appl. No. 11/695,016, Final Office Action mailed Sep. 13, 2010", 15 pgs.

"U.S. Appl. No. 11/695,016, Non-Final Office Action mailed Apr. 20, 2010", 14 pgs.

"U.S. Appl. No. 11/695,016, Response filed Jul. 2, 2010 to Non Final Office Action mailed Apr. 19, 2010", 8 pgs.

"U.S. Appl. No. 11/695,021, Non Final Office Action mailed Feb. 17, 2011", 10 pgs.

"U.S. Appl. No. 11/695,021, Final Office Action mailed Jul. 20, 2011.", 11.

"U.S. Appl. No. 11/695,021, Response filed May 17, 2011 to Non Final Office Action mailed Feb. 17, 2011", 22 pgs.

* cited by examiner

METHOD AND APPARATUS FOR ADAPTIVE INTEGRITY MEASUREMENT OF COMPUTER SOFTWARE

TECHNICAL FIELD

Various embodiments described herein relate generally, to the field of computer architecture, and more particularly to adaptive integrity measurement of computer software.

BACKGROUND

Systems and methods are present in one or more currently shipping operating systems that provide for the secure execution of software components. Exploits within these software components and attacks on them represent very large security risks in individual systems, specifically, and in larger networked systems. Though the system as a whole is protected from attack, the interoperability with weaker software components can create an insecure system.

Present methods utilizing Virtual Technology (VT) stop at ensuring the runtime integrity of software programs and data at a modular level. Integrity of the binary files is taken care of at individual software levels. In other words, these methods verify the integrity of software like islands, and do not consider the interaction points between silos of code. For example, using VT integrity services we can ensure that integrity verified agent gets called into at certain entry points however, there is no check to ensure that the entity that calls into this protected code is itself verified. The performance issue that remains open is that current methods do not take into account the frequency of interaction between components to optimize the integrity protections to reduce the cost of the interaction. In our VT Integrity services approach today, each transition from unprotected to protected code costs a transition into the VMM (Virtual Machine Monitor)) which adds a significant delay to the operation being performed. The interaction between software components does not remain static on a platform. In order for such a dynamic platform to remain trusted, there needs to be an adaptive method to verify the integrity of software encountered on the platform.

BRIEF DESCRIPTION OF THE DRAWINGS

The drawings illustrate generally, by way of example, but not by way of limitation, various embodiments discussed in the present document.

DETAILED DESCRIPTION OF THE DRAWINGS

In the following detailed description of embodiments of the invention, reference is made to the accompanying drawings which form a part hereof, and in which are shown, by way of illustration, specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed.

In an embodiment, the methods and apparatus described herein provide a framework in which only authorized software components are able to access and/or modify the state of a hardware device coupled to the computing system. Traditionally, virtualization technologies have focused on provide virtualized and isolated environments in which software components are executed by prevented from accessing or modifying the state of another software component. The methods and apparatus described herein extend that protection to device drivers, which are software components executed within one of the virtualized machines that provide access to one or more hardware devices. In a further embodiment, the systems and methods described herein provide a framework that adaptively protects hardware devices from unauthorized access during operations that call or access the hardware. This provides, in some examples, a system of protection that works dynamically and is not restricted to just a static check of the identity or validity of the software component accessing the hardware device.

Figure 1:
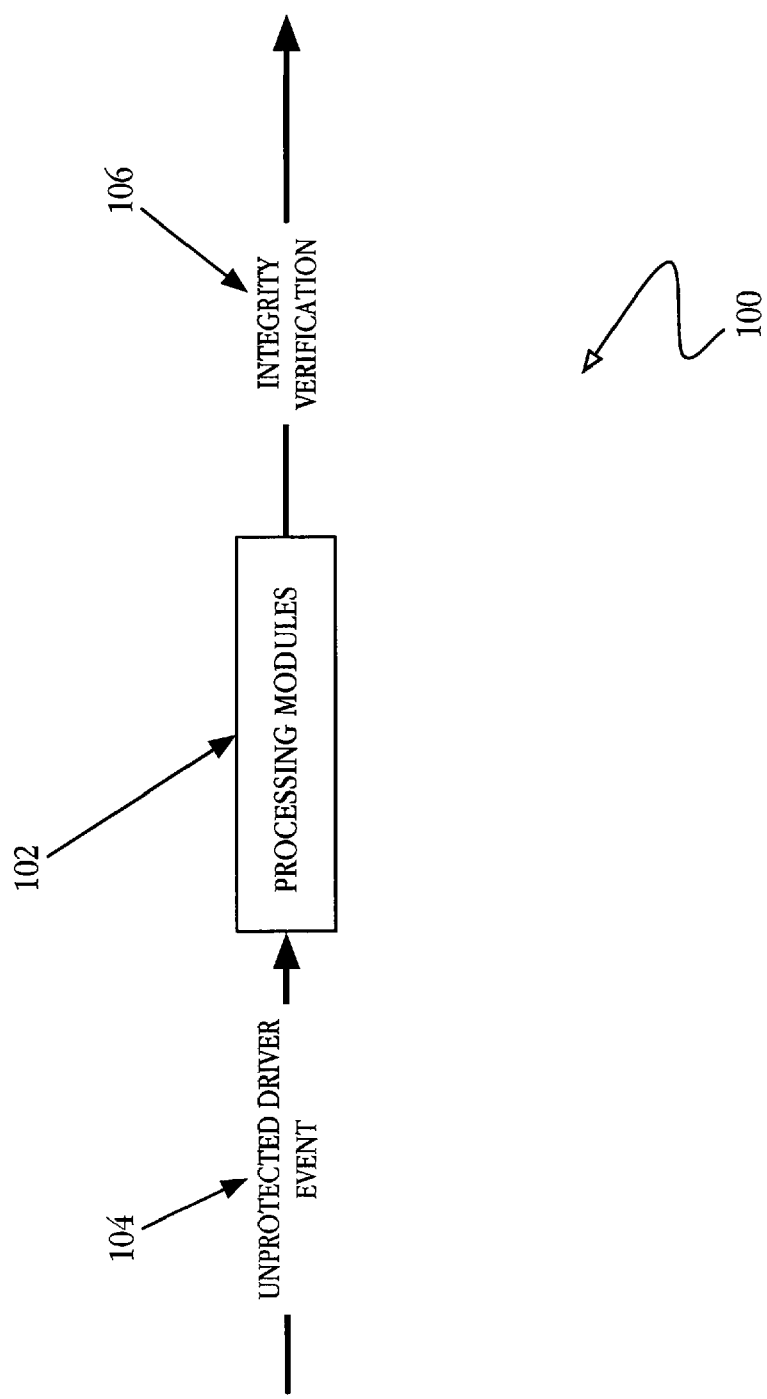
FIG. 1 shows a high level block diagram of a system, in accordance with an example embodiment of the present invention.

FIG. 1 shows a high level block diagram of a system, in accordance with an example embodiment of the present invention. The system 100 includes one or more processing modules 102 that receive, or detect, an unprotected driver event 104, in an embodiment. The processing modules, configured as described herein, and performing the methods described herein, perform and output an integrity verification 106, in an embodiment. This verification may be a verification of the actual integrity of the code of the driver sending the event 104, in some embodiments. In further embodiments, the verification may include verification of the access, itself, as well as the contents to the access request.

In an embodiment, the unprotected driver event 104 is blocked by the processing modules 102 from accessing the hardware device referenced in the event until the verification is returned. In some embodiments, the driver event 104 is verified by both a comparison of the code and a memory entry point. If the integrity verification is returned as denied, then further alerts may be raised by the processing modules.

Figure 2:
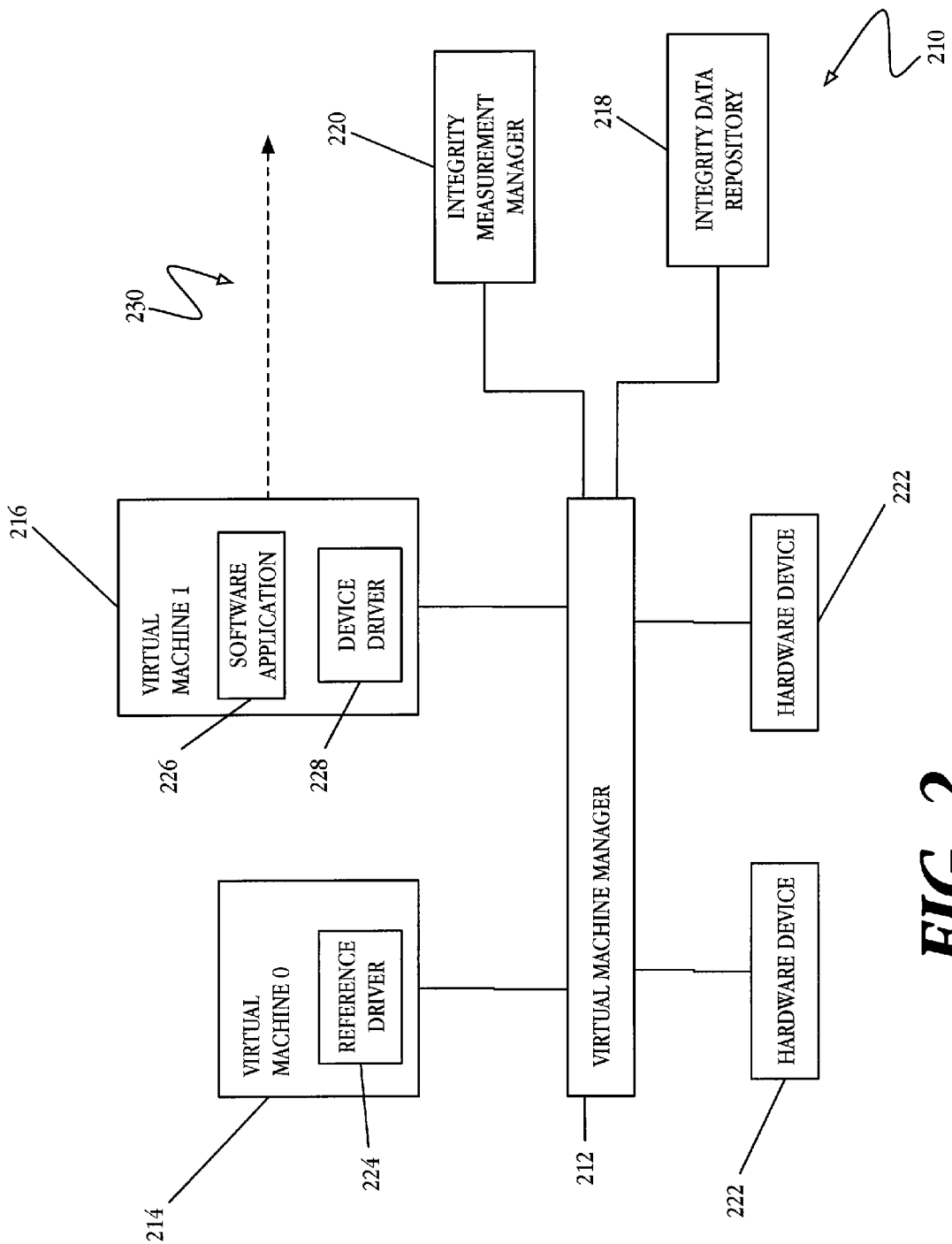
FIG. 2 shows a high level block diagram of an apparatus, in accordance with an example embodiment of the present invention.

FIG. 2 shows a high level block diagram of an apparatus, in accordance with an example embodiment of the present invention. The apparatus 210 includes a virtual machine manager 212, a first virtual machine 214, one or more additional virtual machines 216, an integrity manifest data repository 218, an integrity measurement manager 220 and one or more hardware devices 222. The first virtual machine 214 includes a reference driver 224 executed therein, in an embodiment. At least one of the more or more additional virtual machines 216 includes a software application 226 and a device driver 228, in an embodiment.

In an embodiment, the virtual machine manager 212 is configured to manage one or more virtual machines. In one example, this may include managing the first virtual machine 214 and the one or more additional virtual machines 216. Only the first of the one or more additional virtual machines 216 is shown on FIG. 2, though the dotted line 230 represents the additional virtual machines, which are configured similarly as virtual machine 1 on FIG. 2.

The reference driver 224 executed within the first virtual machine 214 is configured to maintain system information regarding one or more software components that have access to and access a hardware device 222. This may include, without limitation, the module base and name, version of the module as created by the developer, and the file name. The virtual machine manager 212 has a pre-provisioned manifest loaded therein to verify the integrity of the reference driver 224, which is the first driver loaded during the execution of the apparatus 210 shown in FIG. 2. In one embodiment, this manifest may be downloaded by leveraging the access control framework such as, without limitation, network adapter card (NAC), network access point (NAP), or terminal node control (TNC). In an embodiment, the reference driver 224 is configured to maintain system information within a log, wherein the log contains at least one of the following: listing of software components loaded into memory, software components offsets in memory, name of the software component and vendor information associated with the software component.

In an embodiment, the first virtual machine 214 is an isolated execution environment. As used herein, an "isolated execution environment" is an execution environment that is configured to execute code independently and securely isolated from a host, the virtual machine 1 216 in this example, which it is communicatively coupled to. In a further embodiment, the isolated execution environment is further configured to prevent software running on the host, or other virtual machines, from performing operations that would alter, modify, read, or otherwise affect the code store or executable code that is running in the isolated execution environment. In the context of the present application, the virtual machine manager 212 is executed inside an isolated execution environment which prevents all software executed by the first virtual machine 214 from altering or reading any instructions contained on the virtual machine manager 212.

The virtual machine manager 212, following the measurement and verification of the reference driver 224, in an embodiment, protects its data structures. This may include, without limitation, hiding some data pages from other software applications, or kernel code. In a further embodiment, the virtual machine manager 212 is configured to provide a protected software environment, or domain, to the reference driver 224, if validated, or other device drivers 218, if validated.

In an embodiment, the integrity measurement manager 220 is configured to receive validation requests regarding one or more software components, such as the device driver 228, and to validate the one or more software components. This may include, without limitation, using the integrity manifest data repository by accessing an integrity manifest for the one or more software components stored therein. In an embodiment, the integrity manifest data repository 218 is configured to store the integrity manifest for one or more software components, such as the device driver 228.

Figure 3:
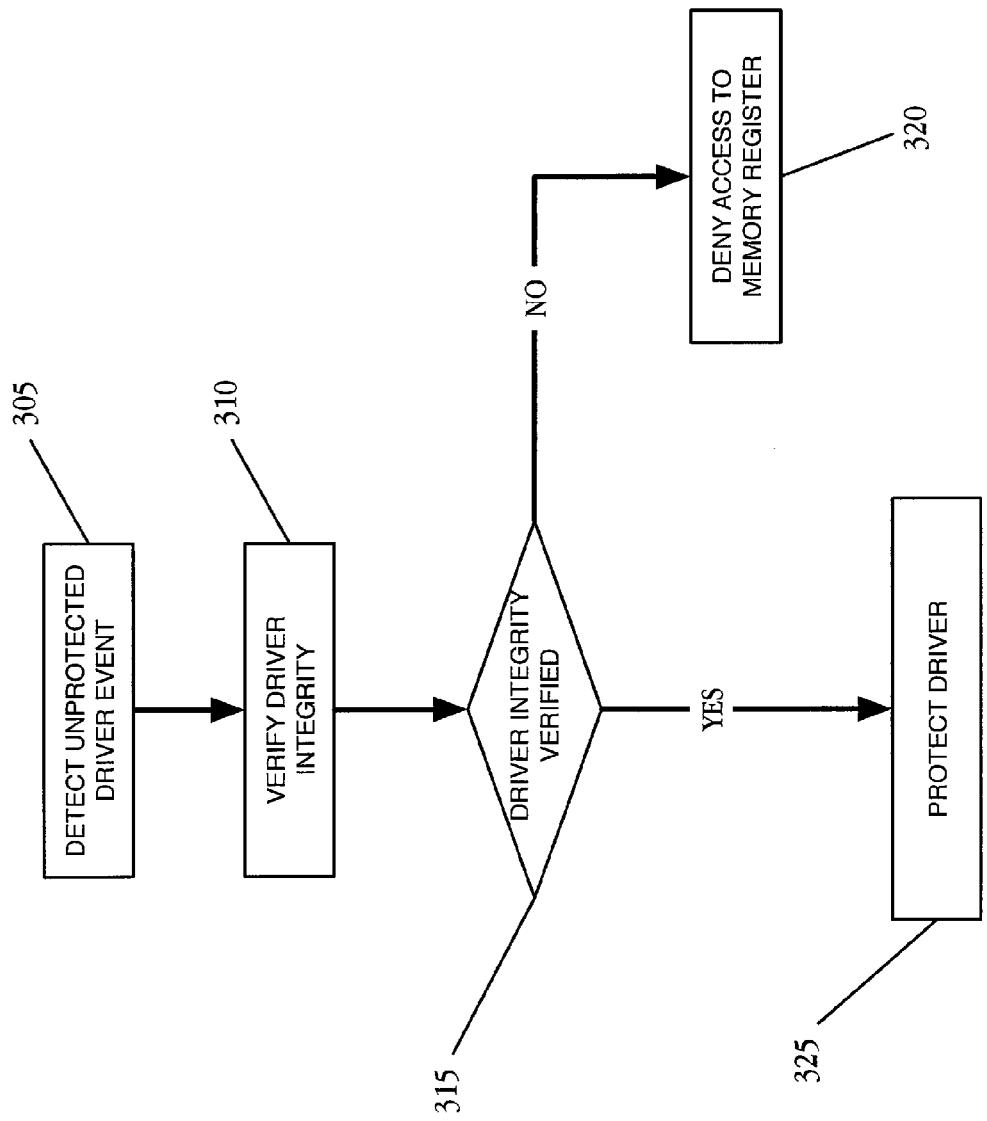
FIG. 3 shows a flowchart of a method, in accordance with an example embodiment of the present invention.

FIG. 3 shows a flowchart of a method, in accordance with an example embodiment of the present invention. The method depicted in FIG. 3 may be carried out by the virtual machine manager 212, as shown above in FIG. 2, in some embodiments.

At block 305, an unprotected driver event is detected. This unprotected driver event may include, without limitation: an instruction fetch page fault that leaves a protected domain for a software component; a data fetch page fault going out of a protection domain for the software component; or on a data fetch page fault going into a protection domain for another software component. At block 310, the integrity of the driver executing the driver event is verified, in one embodiment. In an alternate embodiment, the fetch or access itself is verified at block 310. An unprotected driver event may also include, in some embodiments, the loaded of new software components or drivers on any of the virtual machines coupled to the virtual machine manager 212. Following the loading, an unprotected driver event in this example, of the driver or software component, a look-up into the integrity manifest data repository is performed. This look-up yields, in some examples, a manifest that can be used to compare against the driver or software component, and thereby verifying the driver or software component. The driver or software component can then be protected, if verified, by the virtual machine manager. This may include, without limitation, moving the driver or software component into a protected domain.

In the example where an instruction fetch page fault leaves the protected domain for a software component, the virtual machine manager 212 checks in the module list and loads the manifest for this called component from the integrity manifest data repository 210. The component is verified for two areas at block 310: its integrity; and a verification of the entry point into the called component. In an embodiment, the call may be blocked until the called component has been verified fully. In other embodiments, only the called page (or only entry point) may be verified and further verification may proceed on demand.

In the example where a data fetch page fault going out of a protection domain, the virtual machine manager 212 checks the module list to locate the component and fetches the manifest for this agent from the integrity manifest data repository 210. The virtual machine manager 212 then checks the integrity of the data owner at block 310, in this example, and the integrity of the data (if static). If the integrity check passes the virtual machine manager 212 moves (or maps based on policy) the checked data area as a shared (or protected page).

In the example where a data fetch page fault going into a protection domain, the virtual machine manager 212 first checks if the accessed page was mapped as read/write (RW) for the agent. If yes, the virtual machine manager 212 checks the module list to locate the component accessing the data and fetches the manifest for this agent from the integrity manifest data repository 210. The virtual machine manager 212 then checks the integrity of software component requesting the data. If the integrity check fails the virtual machine manager 212 may return garbage data (map a temporary page) to the software component requesting the data. In another embodiment using software addition, the virtual machine manager 212 may return error codes in addition to the pages mapped for the software component requesting the data.

In an embodiment, the data access associated with the unprotected driver event detected at block 305 may be blocked at block 320 until the accessed component has been verified fully. In alternate embodiments, only the accessed data page may be verified (if static) and further verification may proceed on demand. In an embodiment, if the data accessed is not described by the manifest, the virtual machine manager 212 may block the access until the accessed component reinitializes the data after integrity verification and data page protection. In some embodiments, any failure during the integrity verification performed at block 310 may result in an alarm or alert executed by the virtual machine manager 212.

If the integrity is verified at block 315, the driver may be protected at block 325, or the data area access by the event may be protected. This may include the virtual machine manager 212 moving the checked data area as a shared data area (or protected page). It may also include the modification of memory page table maps, in other examples.

In FIG. 3, particular methods of example embodiments are described by reference to a flow chart. The methods to be performed constitute computer programs made up of computer-executable instructions.

At Step 302, reference driver provides system information (that it maintains) and lists the module base and name for example, there may be other information the reference driver provides, for example, the version of the file as created by the vendor. As new agents or drivers load on the system, each registration is followed by a lookup into a Manifest storage (local or remote) that is used to verify the agent by itself and protect it if it passes the checks.

The methods and systems depicted provide a framework that ensures the integrity (or non-integrity) of components that interact with each other by collecting runtime information collected from the OS kernel at the time the platform is booted; enforcing adaptive protection policies in the virtual machine manager 212 based on interaction between verified components; and access controlling interaction between verified components by setting up appropriate protection in the virtual machine manager 212.

The methods of this application utilize virtualization technology to increase the reliability and security of software components that execute within a virtualized environment. This, in some examples, secures virtualized systems against rootkits and spyware that hook into valid code paths or directly access kernel and other sensitive data structures. Some example applications of embodiments described herein include, without limitation: allowing software to be integrity checked from the bottom up without prior knowledge or white listing agents; not usurping legacy usage since the operating system continues to load security agents, device drivers and schedules their execution from within the virtual machine that executes the operating system; capturing all software interaction (including data and code accesses) on the platform which disallows rootkits and spyware from hiding on the platform; and building a transitive trust model for runtime integrity of software (as opposed to load time transitive trust).

To summarize the above, the present application describes a method of using platform features such as VT to be able to verify the integrity of a large combination of platforms based on the choice of users installing software. It also addresses performance issues with previous approaches. In essence, it allows all software that executes on the platform to be checked for runtime integrity starting from the initial software that executes i.e. the boot loader code. Additionally, this method uses runtime information to associate code executing on the platform with its manifest and can create an integrity verified map of all the software that is interacting on the platform.

Embodiments of the methods of the present invention provide an Integrity Management manager to receive validation requests regarding the one or more software components and to validate the one or more software components using the integrity manifest data repository.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

The invention claimed is:

1. An apparatus comprising:
   a plurality of virtual machines, the plurality of virtual machines including a first virtual machine and one or more additional virtual machines, the first virtual machine existing in an isolated execution environment, the isolated execution environment operable to execute code independently and securely isolated from each of the one or more additional virtual machines, the first virtual machine including a reference driver operable to execute within the isolated execution environment, the additional virtual machines including one or more software components;

a virtual machine manager coupled to the plurality of virtual machines, the virtual machine manager including a manifest loaded into the virtual machine manager to verify the integrity of the reference driver, the virtual machine manager operable to provide the isolated execution environment and to prevent software running on the additional plurality of virtual machines from altering, modifying, reading or otherwise affecting any code stored and any code running in the isolated execution environment;

an integrity manifest data repository coupled to the virtual machine manager, the integrity manifest data repository operable to store an integrity manifest for at least one of the one or more software components, the integrity manifest for a given software component including integrity verification of the given software component based on runtime information associated with the given software component; and an integrity measurement manager coupled to the virtual machine manager, the integrity measurement manager operable to receive from any given one of the additional virtual machines a validation request based on a call regarding a given software component of the one or more software components, and to validate the given software component using verification of two areas including the integrity manifest for the given software component and verification of an entry point in the call for the given software component, the integrity measurement manager operable to provide an integrity verification if the given software component is verified in both the two areas wherein the virtual machine manager is operable to block access by the given software component to and from the isolated execution environment until the integrity verification for the given software component has been received.

2. The apparatus of claim 1, wherein the virtual machine manager is further configured to provide a protected domain to the given software component if an integrity verification is provided for the given software component.

3. The apparatus of claim 1, wherein the reference driver is operable to maintain a system information within a log containing at least one of the following: a listing of software components loaded into a memory, software components offsets in the memory, a name of the software component and vendor information associated with the software component.

4. A method comprising:
providing an isolated execution environment including a protected domain, the isolated execution environment including either stored code or code being executed, or both stored code and code being executed, within the isolated execution environment;

detecting an unprotected driver event being executed by a driver, wherein the unprotected driver event includes at least some access outside the isolated execution environment from within the isolated execution environment or access to within the isolated execution environment from outside the isolated execution environment;

verifying the integrity of the unprotected driver event by comparing the unprotected driver event to at least a pre-loaded integrity manifest stored in an integrity manifest data store including verifying the integrity of the unprotected driver event using verification of two areas including the integrity manifest for the unprotected driver event and verification of an entry point in the call for the given unprotected driver event;

providing an integrity verification for the unprotected driver event if the integrity of the unprotected driver event is verified, and blocking the access requested by the unprotected driver event until and unless the integrity verification for the unprotected drover event is provided.

5. The method of claim 4, wherein the unprotected driver event is an instruction fetch page fault which leaves the isolated execution environment and the integrity is additionally verified by verifying the entry point into a software component called by the instruction page fetch.

6. The method of claim 4, wherein the unprotected driver event is a data fetch page fault out which leaves the isolated execution environment, and the integrity is additionally verified by the owner of data associated with the data fetch page fault.

7. The method of claim 6, wherein the unprotected driver event is blocked until the integrity of the driver is verified by both the comparison and the owner of the data.

8. The method of claim 6, wherein the unprotected driver event is blocked until either the integrity of the driver is verified by the comparison, or the owner of the data is verified.

9. The method of claim 4, wherein the unprotected driver event is a data fetch page fault which enters the isolated execution environment, and prior to verifying the integrity of the unprotected driver event, an accessed page referenced in the data fetch page fault is mapped as read/write (RW) for a driver initiating the unprotected driver event.

10. The method of claim 9, further comprising:
verifying the integrity of the driver if the accessed page is mapped as RW for the driver by locating the driver in a module list and fetching the integrity manifest for that driver.

11. The method of claim 10, further comprising:
returning garbage data to the driver if the integrity of the driver is not verified.

* * * * *